United States Patent [19]

Holthusen

[11] 4,349,272

[45] Sep. 14, 1982

[54] CIRCUIT ARRANGEMENT FOR CONTROLLING THE EXPOSURE TIME OF REPRODUCTION CAMERAS

[75] Inventor: Bernd Holthusen, Hamburg, Fed. Rep. of Germany

[73] Assignee: Dr. Böger Duplomat Apparate KG (GmbH & Co.), Fed. Rep. of Germany

[21] Appl. No.: 204,989

[22] Filed: Nov. 7, 1980

[30] Foreign Application Priority Data

Nov. 8, 1979 [DE] Fed. Rep. of Germany ....... 2945166

[51] Int. Cl.³ .......................... G03B 7/00; G03B 27/72
[52] U.S. Cl. .......................................... 355/69; 354/21
[58] Field of Search ...................... 355/35, 40, 41, 69, 355/70; 354/21

[56] References Cited

U.S. PATENT DOCUMENTS

| 3,963,344 | 6/1976 | Hujer et al. | 355/35 |
| 4,017,180 | 4/1977 | Yen et al. | 355/70 X |
| 4,173,401 | 11/1979 | Harvey | 354/21 |

FOREIGN PATENT DOCUMENTS

| 1522064 | 12/1969 | Fed. Rep. of Germany . |
| 2322793 | 11/1974 | Fed. Rep. of Germany . |
| 2352765 | 4/1975 | Fed. Rep. of Germany . |
| 2411343 | 9/1975 | Fed. Rep. of Germany . |
| 2534516 | 2/1976 | Fed. Rep. of Germany . |
| 2552589 | 5/1977 | Fed. Rep. of Germany . |
| 2749721 | 5/1979 | Fed. Rep. of Germany . |
| 2010500 | 6/1979 | United Kingdom . |

*Primary Examiner*—Michael L. Gellner

[57] ABSTRACT

The exposure time of a reproduction camera 22 is automatically controlled by markings 12, 26 provided on the packaging 11 for the photographic material and which represent the sensitivity of the material and its emulsion number respectively. These markings are read by a read head 13 and stored in a memory 14. A decoder 15 is able to translate the stored information into a signal which is passed to a multiplier 24 and used to modify a basic time signal supplied from a coding switch 25 to the multiplier. The resulting signal is passed to a comparator 17. On receipt of a signal at the comparator 17 an exposure control device 16, which has been previously energized via start button 20 energizes the exposure lamps 21 and the exposure commences. A counter 19 starts a count at the beginning of the exposure period and this count is compared in the comparator with the signal received from the multiplier 24 and, as soon as equality is reached, the exposure control device is automatically switched off. The multiplier is also able to modify the exposure time via signals 30, 30' representative of the selected aperture and reproduction sizes.

7 Claims, 1 Drawing Figure

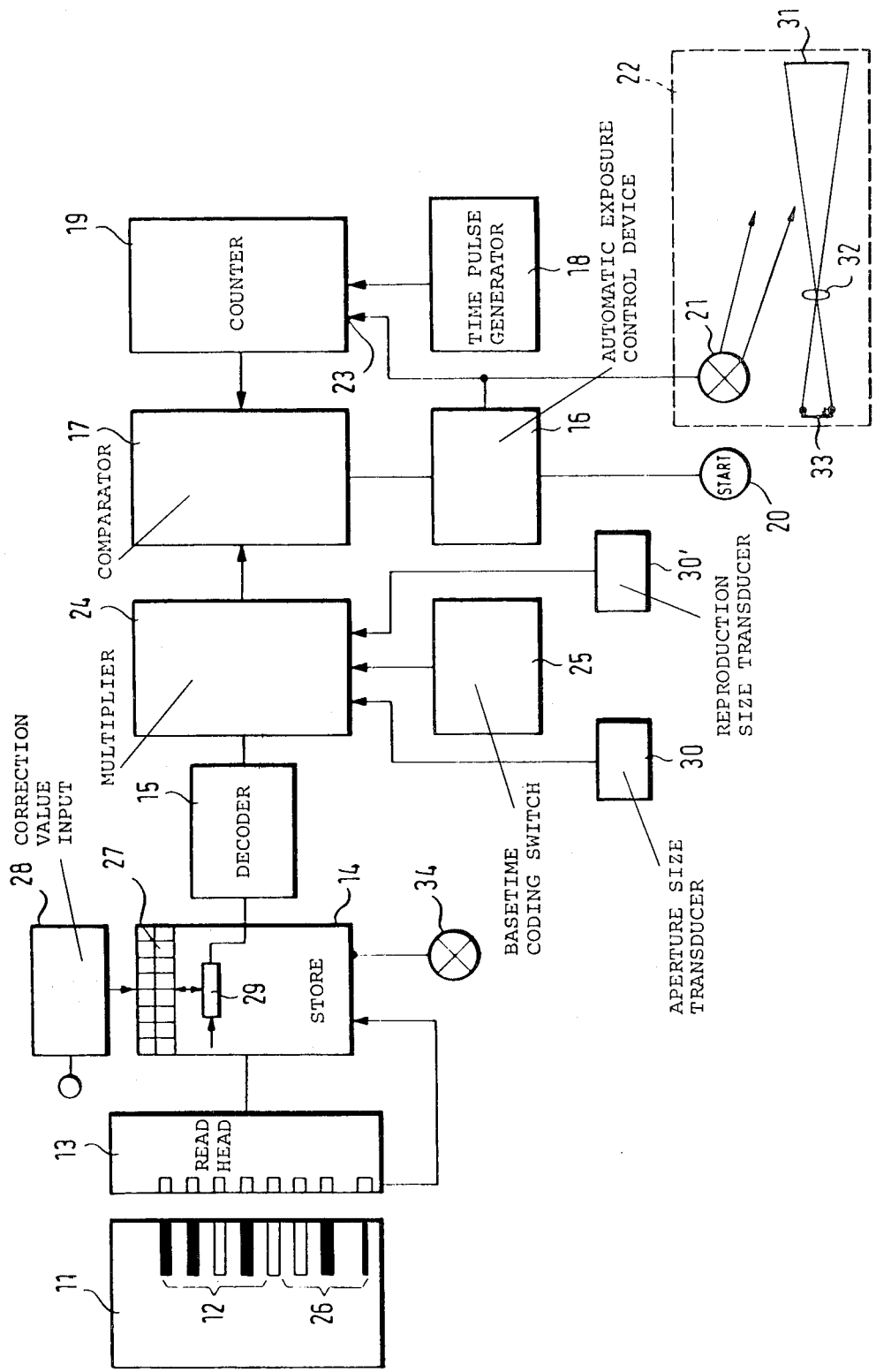

CIRCUIT ARRANGEMENT FOR CONTROLLING THE EXPOSURE TIME OF REPRODUCTION CAMERAS

The invention relates to a circuit arrangement for controlling the exposure time of reproduction cameras in dependence on the sensitivity of the photographic material that is used.

Up to now it has been necessary when using reproduction cameras to carry out test exposures with a specific photographic material prior to each exposure in order to determine the correct exposure time. It is only possible to forego the test exposure procedure when a material with the same emulsion number, for which the correct exposure time has already been determined, is used. However, even in this case the operator must first of all establish, by reading the emulsion number from the packaging and by comparison with the emulsion number of a previously emptied package, whether an exposure time has already been determined for the relevant emulsion number or not. This comparison can only be carried out when the prevailing brightness is sufficient to allow the information to be read from the packaging. This is however difficult when working in a dark room.

The object underlying the invention is thus to provide a circuit arrangement of the initially named kind by which the operator can select the correct exposure time by means of simple hand operations even in a fully darkened room.

To accomplish this object the invention envisages that markings characteristics of the sensitivity of the photographic material are provided on the packaging of the photographic material and that a store for receiving these markings via a reading head is provided which actuates an exposure control device, equipped with a start key and to which the light source(s) of the reproduction camera is (are) connected, via a decoder which delivers a time signal in dependence on the sensitivity.

In this manner the operator merely needs to guide the read head over the markings on the packaging in order to set the correct exposure time at the reproduction camera. This can also take place in a completely darkened room because the markings can be readily provided at a predetermined position on the packaging, in particular on one of the narrow sides to which the reading head can be readily brought simply by feel. The use of the circuit arrangement in accordance with the invention is moreover extremely simple so that even inexperienced individuals can readily use the same. Any possible confusion or errors involved in reading the numbers arranged on the packaging are also obviated when using the circuit arrangement of the invention. The packaging itself directly controls the exposure time via the read head.

It is particularly advantageous if the time signal is applied to a comparator with timing pulses delivered by a counter and controlled by a time generator being passed to the other input of the comparator and if the output of the comparator delivers a stop signal to the exposure control device when the time signal equals the sum of the timing pulses. The counter is initiated by pressing the start key. At the same time the exposure lamp is switched on. As soon as, in the comparator, the desired value delivered by the store reaches the actual value supplied by the counter the comparator passes a stop signal to the exposure control device and the exposure lamp goes out. For this purpose the exposure control device is connected with the start input of the counter.

A particularly preferred embodiment features a multiplier connected after the decoder, and a base time coding switch connected to one input of the multiplier, with the time signal delivered from the decoder representing a relative time factor by which the base time signal delivered by the base time coding switch is multiplied in order to obtain an exposure time signal which is applied to the comparator and which reproduces the absolute exposure time. The base time set at the coding switch is a characteristic time value for the associated reproduction camera and can be designated as a mean or average exposure time. The time signal delivered by the decoder increases or reduces this basic exposure time by a percentage which depends on the size of the time signal so that an exposure time signal is present at the output of the multiplier which directly reproduces the correct exposure time. An aperture indicator which corrects the exposure time signal in dependence on the selected aperture can also be connected to the multiplier. Furthermore a reproduction size indicator which corrects the exposure time signal in dependence on the selected size of the reproduction can also be connected to the multiplier. The aperture and reproduction sizes can however previously have been taken into account by appropriate adjustment of the base time coding switch.

In order also to be able to take account of the emulsion number a particularly preferred embodiment of the invention envisages that markings characteristic of the emulsion number are also provided on the packaging for the photographic material and that the read head also passes these markings in the form of an electrical signal to the store which contains a number of store locations for correction values dependent on the emulsion number and which can be written into the individual store locations via a correction value input which is controllable by hand, and in that the store contains an automatic interrogation device which interrogates all the existing store locations for the presence of a correction value corresponding to the emulsion number that is present and which, on establishing the presence of a correction value for this emulsion number delivers the same to the decoder.

As a result of this special construction of the store of the invention the special characteristics of an emulsion having a special number can also be taken into account by virtue of the fact that the exposure time correction values that are required have been previously written into a store location. The reading of these further markings with the read head is carried out in the same working step as the read out of the sensitivity markings so that additional effort on behalf of the operator is not required. In the store the store locations are automatically interrogated for the presence of a correction value for the relevant emulsion number. As a result an output signal is present at the output of the store which not only takes account of the sensitivity but also of the characteristics of the relevant emulsion number and this output signal is converted in the decoder into a corresponding time signal for the multiplier.

If the automatic interrogation device establishes that no correction value has as yet been stored in a store location for a specified emulsion number then a signal appears which informs the operator of this fact. The operator can now either content himself with the uncorrected time signal or make use of the method of the invention for writing a correction value into a store location of the store. This method is characterized in that a test exposure is first of all carried out using the uncorrected stored value corresponding to the sensitivity marking delivered by the store, that the optical density of the developed photographic material is then measured and a correction value, corresponding to the deviation of the blackening of the photographic material from the desired value, is fed by hand into the correction value input, that the test exposure is repeated using this correction value and, if required, that a new correction is effected, and so on until the input correction value produces the desired darkening, and that the correction value found for the associated emulsion number is then fixed in a store location associated with the emulsion number.

After the correct correction value has been written into a store location of the store this value is always available in the event that a packaging with the same emulsion number is used.

In general it is sufficient if the store has approximately 100 store locations for the correction values of specific emulsions. As soon as all store locations are occupied the content of the store location occupied with the oldest information is automatically deleted on writing in information on a new emulsion.

The invention will now be described in the following by way of example and with reference to the drawing the single FIGURE of which shows a block circuit diagram of a circuit arrangement in accordance with the invention.

As seen in the drawings two groups of markings 12 and 26 are provided on the packaging 11 of a photographic material. These markings can, by way of example, take the form of the known "UPC code". The markings 12 specify in coded form the sensitivity on the photographic material contained in the packaging 11 while the markings 26 indicate, again in coded form, the number of the emulsion of the photographic material. The exposure time specified by the sensitivity has to be corrected upwardly or downwardly in dependence on the emulsion number.

The markings 12, 26 are read by a reading head 13 which is guided over the markings or, alternatively, beneath which the markings are guided. The read outs from the markings are stored in a store 14 where they are available for further processing.

A signal which takes into account both the sensitivity and the emulsion number, is formed via an automatic interrogation device 29 which will subsequently be described in detail. This signal is converted in a subsequent decoder 15 into a time signal.

This time signal is applied to the one input of a multiplier 24 and a base time signal from a base time coding switch 25 is passed to the other input thereof. The base time signal corresponds to a characteristic basic exposure time for a reproduction camera 22 which is merely schematically illustrated in the drawing. This basic exposure time depends for example on the light intensity of the lamp 21 in the reproduction camera 22 and also on the condensors. If required an aperture size transducer 30 and a reproduction size transducer 30' can also be connected to the multiplier 20 to correct the illumination time signal in accordance with the selected size of the aperture and the selected size of the reproduction respectively. The selected aperture and reproduction sizes can however also be taken into account by corresponding adjustment of the coding switch 25.

The time signal delivered by the decoder 15 preferably represents a percentage value by which the basic time set at the coding switch 25 is increased or reduced depending on the sensitivity marking 12 and the emulsion marking 26 which have been read from the packaging 11.

At the output of the multiplier 24 there is available an exposure time signal which is fed to one input of a comparator 17 and which gives the exposure time directly. The output of a counter 19 which is controlled by a time pulse generator 18 is applied to the other input of the comparator 17. The counter is started by a start signal passed to its input 23 and delivered from an automatic exposure control device 16 which can be initiated by a start key 20. The start signal is moreover passed to the light source 21 for the exposure which is arranged inside the reproduction camera 22. The drawing also shows in purely schematic form the image 31 which is to be photographed, the objective 32 and the photographic material 33 which is to be exposed.

As soon as equality is reached in the comparator 17 between the exposure time signal supplied by the multiplier 24 and the summed time count pulses from the counter 19 the comparator 17 passes a stop signal to the automatic exposure switching device 16 which simultaneously extinguishes the exposure lamp 21, stops the counter 19 and resets it to zero.

In the store or memory 14 there are also provided, in addition to the store locations for the markings 12, 26 approximately a hundred further storage locations 27 for storing the correction values associated with the markings 26.

After each reading operation the automatic interrogation device 29 interrogates all the storage locations 27 to establish whether a correction value for the exposure time corresponding to the marking 26 which has just been read is stored in any one of the storage locations. If this is the case then the corrected value is given to the decoder 15 and used in the multiplier 24 in place of the straight forward exposure signal formed from the sensitivity markings 12 so that, when calculating the exposure time, not only the sensitivity of the photographic material but also the special emulsion number given by marking 26 are taken into account.

If the automatic interrogation device 29 establishes when interrogating the storage locations 27 that no correction value is as yet present for the relevant emulsion number a signal appears, for example at a lamp 34, which makes the operator aware of this circumstance.

A test exposure using an exposure time determined by the markings 12 is now effected of, by way of example, a grey wedge. The exposed and developed photographic material is now examined to establish whether the blackening of the material corresponds to the desired value or not. Depending on the outcome of this examination a correction value is set by hand at the correction value signaller 28 and is written into the next free store location 27. A further test exposure is then carried out with this correction value. Any eventually necessary further correction is then likewise written into the specified store location 27 via the correction value signaller 28 with deletion of the existing, not yet fully correct, correction value. This process is continued until an exposure time is achieved, as a result of the correction value written into the store location 27, which produces exactly the required darkening of the photographic material 33.

This correction value is now always available in the associated store location 27 and is automatically called up as soon as the automatic interrogation device 29 finds a marking 26 corresponding to the associated emulsion number on another package 11. The requirement for the operator to direct his attention of his own accord to the characteristics of the photographic material that is being used is thus obviated. Above all the interrogation of the sensitivity markings 12 and the emulsion marking 26 can also take place in completely darkened rooms.

The manner of operation of the circuit arrangement of the invention is as follows:

In order to switch in the correct exposure time it is only necessary to move the reading head 13 over the markings 12, 26. As soon as the emulsion number corresponding to the marking 26 has been stored in one of the store locations 27 an exactly correct exposure time signal appears at the output of the multiplier 24. If the start key 20 is now pressed then an exposure of exactly the predetermined duration takes place.

If the relevant emulsion number corresponding to the marking 26 has not yet been written into one of the store locations 27 then the required correction value is written into a free store location 27 in accordance with the above described procedure by means of the correction value signaller 28 whereupon this correction value is always available in the event that packages with the same emulsion number once again appear.

I claim:

1. A circuit arrangement for controlling the exposure time of a reproduction camera in dependence on the package of photographic material that is used, said package bearing markings characteristic of the sensitivity of the photographic material, the circuit arrangement comprising a store, a reading head for reading said markings to generate electrical signals representative thereof and for passing said electrical signals to said store, a decoder for decoding information stored in said store to produce a decoded signal related to the sensitivity of the photographic material, light source means for the reproduction camera, a switching control device connected to said light source means for switching said light source means on and off, a basic time coding switch for supplying a basic exposure time signal related to the exposure characteristics of the particular reproduction camera, a multiplier for forming an exposure time signal equal to the product of the basic exposure time signal and the decoded signal, a start key connected to said switching control device for initiating the exposure and comparator means connected to terminate the exposure via said switching control device when the time elapse since initiation of the exposure equals said exposure time signal.

2. A circuit arrangement in accordance with claim 1 and further comprising an aperture transducer connected to said multiplier to correct said exposure time signal in dependence on the aperture selected.

3. A circuit arrangement in accordance with claim 1 and further comprising a reproduction size transducer connected to said multiplier to correct said exposure time signal in accordance with the selected size of the reproduction.

4. A circuit arrangement in accordance with claim 1 and further comprising a time pulse generator and a counter for measuring the time elapse since initiation of the exposure said counter having a start input connected to said switching control device and said comparator means being connected to compare the count of said counter with said exposure time signal.

5. A circuit arrangement in accordance with any one of the claims 1, 2, 3, or 4 wherein said markings include markings characteristic of the emulsion number of the photographic material, wherein said store includes a number of store locations for correction values dependent on the emulsion number and a correction value input by means of which correction values can be written by hand into said store locations, said store further comprising an automatic interrogation device which interrogates all said store locations for the presence of a correction value corresponding to the emulsion number read from said markings, and, on establishing the presence of a corresponding correction value, passes the same to said decoder and, on establishing that no correction value is present, signals this fact to an operator.

6. A circuit arrangement in accordance with claim 5 and wherein said correction value input is adapted, in the event that all said store locations are full, to delete the oldest correction value in any of said store locations.

7. A method for writing in a correction value into a store location of the store of the circuit arrangement of claim 6, characterized in that a test exposure is first of all carried out using the uncorrected stored value corresponding to the sensitivity marking delivered from the store, that the optical density of the developed photographic material is then measured and a correction value corresponding to the deviation of the blackening of the photographic material from the desired value is then fed by hand into the correction value input, that the test exposure is repeated using this correction value and, if required, that a new correction is effected and so on until the input correction value produces the desired darkening and that the correction value found for the relevant emulsion number is then fixed in a store location associated with the emulsion number.

* * * * *